United States Patent [19]
Kohl et al.

[11] 3,771,067
[45] Nov. 6, 1973

[54] LASER APPARATUS FOR USE IN OPERATIONS WITH EXPLOSION HAZARD

[75] Inventors: Arno Kohl; Martin Schachinger, both of Erlangen; Helmut Kindl, Munich; Otmar Hintringer, Neubiberg, all of Germany

[73] Assignee: Siemens Aktiengesellschaft, Berlin, Munich, Germany

[22] Filed: Mar. 24, 1972

[21] Appl. No.: 237,632

[30] Foreign Application Priority Data
Mar. 25, 1971  Germany.................. P 21 14 449.0

[52] U.S. Cl............................................ 331/94.5 D
[51] Int. Cl................................................ H01s 3/02
[58] Field of Search................................... 331/94.5

[56] References Cited
UNITED STATES PATENTS
3,361,989  1/1968  Sirons............................... 331/94.5
3,628,175  12/1971  Rigden............................. 331/94.5

*Primary Examiner*—William L. Sikes
*Attorney*—Arthur E. Wilfond

[57] ABSTRACT

The cylindrical metal housing of a gas laser serves as an explosion protection housing. The explosion protection is achieved by bodies inserted into the housing in front of and behind a discharge tube in a pressure-type manner, and by a feedthrough cap.

4 Claims, 1 Drawing Figure

PATENTED NOV 6 1973　　　　　　　　　　　　　　　　　3,771,067
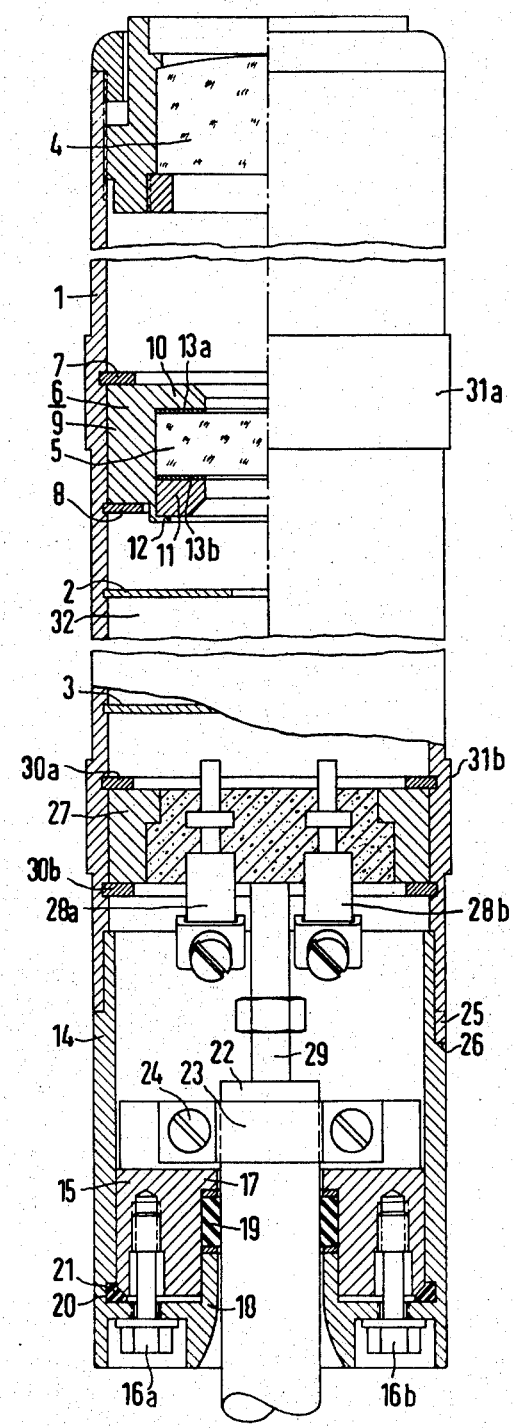

LASER APPARATUS FOR USE IN OPERATIONS WITH EXPLOSION HAZARD

DESCRIPTION OF THE INVENTION

The present invention relates to laser apparatus. More particularly, the invention relates to laser apparatus for use in operations with an explosion hazard.

Laser apparatus for use in operations with an explosion hazard comprises a discharge tube in a cylindrical metal housing which receives the electronic components for the power supply in a coaxial arrangement. One end of the housing carries an optical lens system. The discharge tube of a gas laser developed and disclosed in a previously unpublished proposal for geodetic purposes, contains a cold cathode discharge component into which a laser capillary is tightly connected. The capillary is closed off by a fully reflecting plate which constitutes the one mirror of the laser resonator and is supported at its free end in a support containing an output window.

A tubular housing closed by two lids at the end faces is utilized for the explosion-proof encapsulation of optical apparatus such as, for example, a laser radiator. One of the housing lids carries parallel rods which transmit the forces to be supplied when closing the housing and which, together with riders which are movable and adjustable on them, form an optical bench which can be adjusted with the housing open, while the other housing lid is movable on the rods. The manufacture of this design in production quantities presents considerable difficulties because of the accuracy required in the machining and assembly of the parts.

The principal object of the invention is to provide laser apparatus for use in operations with explosion hazard, which apparatus is of simple structure and functions as an explosion-proof housing.

An object of the invention is to provide laser apparatus for use in operations with explosion hazard, which apparatus is of light weight and convenient or small dimensions.

In accordance with the invention, to avoid the aforedescribed difficulties, the aforedescribed laser apparatus is provided with a body transparent for the laser beam at the beam output side. At the electrical connection side, a body with feed-throughs for the electrical terminals is provided in a pressure-tight manner. The end of the housing at the terminal side is covered by a feed-through cap.

In the known design, in addition to a housing accommodating the discharge tube, another housing, constructed as per the protection class "pressure-resistant encapsulation" is provided. In the laser apparatus of the invention, the cylindrical metal housing accommodating the discharge tube directly forms the explosion-proof housing in conjunction with the bodies inserted in a pressure-tight manner and the cap. For the purpose of inserting the bodies in a pressure-tight manner, ring grooves are arranged in the metal housing. Securing rings holding the bodies are inserted in the ring grooves. The cap and a substantially annular or ring-shaped insert with a hole for the electrical power cable or line are connected to each other by bolts accessible from the outside. The substantially annular insert and a strap provide tension relief for the cable or line. The cap is fitted into the housing by mutually engaging parts, so that the cap and the housing are secured against rotation.

In order that the invention may be readily carried into effect, it will now be described with reference to the accompanying drawing, wherein the single FIGURE is a schematic diagram, partly in section, of an embodiment of the laser apparatus of the invention.

The laser apparatus of the invention, as shown in the Figure, comprises a housing 1, which comprises, for example, light metal. Adjustable braces 2 and 3 are provided in the housing 1. The braces 2 and 3 carry the discharge tube in coaxial arrangement and carry the necessary accessories, including the electronic components of the power supply in coaxial arrangement.

An optical lens system 4 is provided at one end of the housing. A body 6 is inserted in a pressure-tight manner on the eye piece between the optical lens system 4 and the brace 2, which carries the end of the discharge tube. The body 6 comprises, for example, a hollow cylindrical insert 9 provided with an annular or ring-shaped extension 10, a mounting 11, two rings 13a and 13b, preferably of soft metal, and a planar glass disc 5 of, for example, Schott glass.

The body 6 is mounted in a pressure-tight manner by securing rings 7 and 8 which engage with corresponding grooves provided in the housing 1. The glass disc 5 is fixed in the hollow cylindrical insert 9 by another annular component or ring 12, which is leaned over after the individual parts are assembled.

A cap 14 is fitted into the part of the housing 1 extending beyond the brace 3. The cap 14 is designed as the power cable or power line feed-in, in conjunction with an annular insert 15. The cap 14 is connected to the insert 15 by bolts 16a and 16b which are locked in said cap at the end face of said cap. The annular insert 15 has an annular extension 17 at its interior. A line feed-in connector 18 is provided adjacent the annular insert 15 at its end and at its inside. A sealing ring 19 is provided between the annular extension 17 of the insert 15 and the end face of the line feed-in connector 18.

A sealing ring 21 inserted in a groove 20 is similarly provided between the inner end face of the cap 14 and the end face of the insert 15 facing said cap. The sealing rings 19 and 21 seal the interior of the cap 14 against the outside, when the bolts 16a and 16b are tightened. At its end face opposite that facing the cap 14, the insert ring 15 is stepped in such a way that the step in conjunction with a strap 23 and screws 24 forms a tension relief for the power cable or line extending through said cap.

The housing 1 is provided, for example, with a projection 25 and the cap 14 is provided with a corresponding recess 26, to prevent the turning of said cap relative to said housing.

Another body 27 is inserted in a pressure-tight manner between the cap 14 and the brace 3. The body 27 has feed-throughs 28a and 28b formed therethrough for the connecting wire cables or leads and affixed thereto by casting, for example. The body 27 is similarly fixed in a pressure-tight manner in the housing 1 by securing rings 30a and 30b engaging corresponding grooves in said housing. The body 27 is connected to the insert 15 by a bolt 29.

The bodies 6 and 27 close off in a pressure-tight manner the interior space forming the interior 32 of the housing 1, which accommodates the discharge tube. The interior 32 is sealed at the periphery of the housing 1. Mounting rings 31 are provided on the outside of the housing 1 for attachment in a levelling device.

The explosion-proof laser apparatus of the present invention is distinguished particularly by its light weight and its convenient or small dimensions.

While the invention has been described by means of a specific example and in a specific embodiment, it should not be limited thereto, for obvious modifications will occur to those skilled in the art without departing from the spirit and scope of the invention.

We claim:

1. Laser apparatus for use in operations with explosion hazard having a cylindrical metal housing having a beam exit end and an opposite electrical power supply end, a discharge tube coaxially arranged in the housing intermediate the beam exit and power supply ends, electronic power supply components coaxially arranged in the housing in the area of the power supply end, and an optical lens system mounted in the housing at the beam exit end of the housing, said laser apparatus comprising a body transparent to the laser beam mounted in the housing in a pressure-tight manner at the beam exit end thereof; another body having a feed-through for a connecting cable mounted in the housing at the power supply end in a pressure-tight manner; and a terminal feed-through cap covering the power supply end of the housing.

2. Laser apparatus as claimed in claim 1, further comprising ring grooves formed in the housing, and securing rings inserted in the ring grooves for holding the body and the other body in the housing.

3. Laser apparatus as claimed in claim 2, further comprising a substantially annular insert in the housing at the power supply end thereof having a hold formed therethrough for accommodating the connecting cable, a strap cooperating with the annular insert for providing a tension relief for the connecting cable, and bolts accessible from the outside for affixing the cap to the annular insert.

4. Laser apparatus as claimed in claim 3, wherein the housing has a projecting portion at its power supply end and the cap has a recess formed therein and cooperating with the projecting portion of the housing to prevent mutual rotation of said cap and said housing.

* * * * *